United States Patent
Lee et al.

(10) Patent No.: US 6,764,723 B2
(45) Date of Patent: Jul. 20, 2004

(54) LIQUID-CRYSTALLINE MEDIUM

(75) Inventors: Seung-Eun Lee, Yokohama (JP);
Nobuo Kubo, Kanagawa-ken (JP);
Masahiro Iijima, Zama (JP); Hideo Ichinose, Kanagawa Pref. (JP);
Yukiomi Tanaka, Ayase (JP); Shinji Nakajima, Atsugi (JP); Yasushi Sugiyama, Atsugi (JP); Takanori Takeda, Kanagawa Pref. (JP)

(73) Assignee: Merck Patent GmbH, Darmstadt (DE)

( * ) Notice: Subject to any disclaimer, the term of this patent is extended or adjusted under 35 U.S.C. 154(b) by 37 days.

(21) Appl. No.: 10/126,878

(22) Filed: Apr. 22, 2002

(65) Prior Publication Data

US 2003/0039769 A1 Feb. 27, 2003

(30) Foreign Application Priority Data

Apr. 20, 2001 (EP) .............................................. 01109740

(51) Int. Cl.$^7$ ........................ C09K 19/30; C09K 19/12
(52) U.S. Cl. ............... 428/1.1; 252/299.63; 252/299.66
(58) Field of Search ...................... 428/1.1; 252/299.63, 252/299.66

(56) References Cited

U.S. PATENT DOCUMENTS 6,465,059 B1 * 10/2002 Bremer et al. ............... 428/1.1
6,541,082 B2 * 4/2003 Lussem et al. .............. 428/1.1
6,592,951 B2 * 7/2003 Heckmeier et al. .......... 428/1.1

FOREIGN PATENT DOCUMENTS

WO      WO 01/07962      *   2/2001

* cited by examiner

Primary Examiner—Shean C. Wu
(74) Attorney, Agent, or Firm—Millen, White, Zelano, Branigan, P.C.

(57) ABSTRACT

The invention relates to a liquid-crystalline medium based on a mixture of polar compounds having negative dielectric anisotropy, which contains at least one compound of formula I

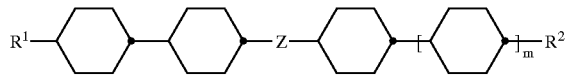

wherein $R^1$ and $R^2$ are independently of each other an alkyl, alkoxy or alkenyl group with 1 to 12 C atoms, it also being possible for one or more $CH_2$ groups in these radicals to be replaced, in each case independently of one another, by —O—, —CH=CH—, —CO—, —OCO— or —COO— in such a manner that oxygen atoms are not linked directly to one another, Z is $OCH_2$ or $CH_2O$, and m is 0 or 1.

50 Claims, No Drawings

LIQUID-CRYSTALLINE MEDIUM

The invention relates to a liquid-crystalline medium based on a mixture of polar compounds having negative dielectric anisotropy, in particular for electro-optical displays having active matrix addressing based on the ECB effect.

The principle of electrically controlled birefringence, the ECB effect, or the DAP effect (deformation of aligned phases) was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

Papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy An and values for the dielectric anisotropy $\Delta\epsilon$ of −0.5 to −5 in order to be usable for high-information display elements based on the ECB effect. Electro-optical display elements based on the ECB effect have homeotropic edge alignment.

A newer variant of ECB displays are active matrix displays based on the VA (vertically aligned) effect, also known as VAN (vertically aligned nematic), or the VAC (vertically aligned cholesteric) effect. VA displays have been described, inter alia, in S. Yamauchi et al., SID Digest of Technical Papers, pp. 378ff (1989), and VAC displays have been described in K. A. Crabdall et al., Appl.Phys.Lett. 65, 4 (1994).

Like the ECB displays which were already known earlier, the more recent VA and VAC displays contain a layer of liquid crystalline medium with a negative dielecgric anisotropy $\Delta\epsilon$ between two transparent electrodes. The molecules in the liquid crystal layer have a homeotropic or tilted homeotropic alignment in the switched-off state, i.e. are aligned substantially perpendicular to the electrode surfaces. Owing to the negative $\Delta\epsilon$, realignment of the liquid crystal molecules parallel to the electrode surfaces takes place in the switched-on state.

In contrast to conventional ECB displays, in which the liquid crystal molecules in the switched-on state have a parallel alignment with uniform preferential direction over the entire liquid crystal cell, this uniform parallel alignment in VA and VAC displays is usually restricted only to small domains within the cell. Disclinations exist between these domains, which are also known as tilt domains. In another type of VA displays the domains are separated by polymer walls.

As a consequence, VA and VAC displays have a greater viewing-angle independence of the contrast and of the grey shades than conventional ECB displays. In addition, VA displays are often simpler to produce, since additional treatment of the electrode surface, like for example by rubbing, for uniform alignment of the molecules is no longer necessary.

In contrast to VAN displays, the liquid crystal media in VAC displays additionally comprise one or more chiral compounds, like for example chiral dopants, which in the switched-on state produce a helical twist of the liquid crystal molecules in the liquid crystal layer by an angle that is typically between 0 and 360°. The twist angle in the preferred case is about 90°.

In particular for these novel VA and VAC displays, special customized liquid crystal media are required. For example, it has been found that the liquid crystal media of negative dielectric anisotropy disclosed hitherto, as described for example in EP 0 474 062, have low values for the voltage holding ratio (HR) after UV exposure. They are therefore not very suitable for use in the displays described above.

The industrial application of the above described effects in electro-optical display elements requires LC phases which must satisfy a multiplicity of requirements. Particularly important here are chemical resistance to moisture, air and physical effects such as heat, radiation in the infra-red, visible and ultra-violet regions and direct and alternating electrical fields. Furthermore, LC phases which can be used industrially need a liquid-crystalline mesophase in a suitable temperature range and low viscosity.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having substantially negative dielectric anisotropy and adequate long-term stability were hitherto not available.

Matrix liquid-crystal displays (MLC displays) are known. Examples of nonlinear elements which can be used to individually switch the individual pixels are active elements (i.e. transistors). This is then referred to as an "active matrix", and a differentiation can be made between two types:
1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joints.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counter-electrode. Compared with the size of the pixel electrode, the TFT is very small and has virtually no adverse effect on the image. This technology can also be extended to fully color-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back.

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

The disadvantage of the MLC-TN displays disclosed hitherto is due to their comparatively low contrast, the relatively high viewing angle dependence and the difficulty of producing grey shades in these displays.

EP 0 474 062 discloses MLC displays based on the ECB effect. The LC mixtures described therein are based on 2,3-difluorophenyl derivatives containing an ester, ether or ethyl bridge and have low values for the "voltage holding ratio" (HR) after exposure to UV and therefore cannot be used for displays of the projection type.

Thus, there continues to be a great demand for MLC displays having very high resistivity at the same time as a wide operating temperature range, short response times and low threshold voltage, with the aid of which various grey shades can be produced.

The invention has an object of providing MLC displays based on the ECB and VA effect which do not have the abovementioned disadvantages, or do so only to a reduced extent, and at the same time have very high resistivities.

Upon further study of the specification and appended claims, further objects and advantages of this invention will become apparent to those skilled in the art.

It has now been found that these and other objects can be achieved if nematic liquid-crystal mixtures according to the p,resent invention are used in these display elements.

The invention thus encompasses a liquid-crystalline medium based on a mixture of polar compounds having negative dielectric anisotropy, which contains at least one compound of formula I

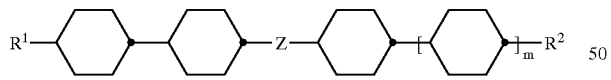

I wherein $R^1$ and $R^2$ are independently of each other an alkyl, alkoxy or alkenyl group with 1 to 12 C atoms, it also being possible for one or more $CH_2$ groups in these radicals to be replaced, in each case independently of one another, by —O—, —CH=CH—, —CO—, —OCO— or —COO— in such a manner that oxygen atoms are not linked directly to one another, Z is $OCH_2$ or $CH_2O$, and m is 0 or 1.

Especially preferred are compounds of formula I wherein m is 0 and Z is $CH_2O$. Further preferred are compounds of formula I wherein $R^1$ and $R^2$ are alkyl or alkoxy, in particular alkyl, with 1 to 6 C atoms.

Preferred embodiments are:

a) A medium which optionally additionally contains one or more compounds of the formula II:

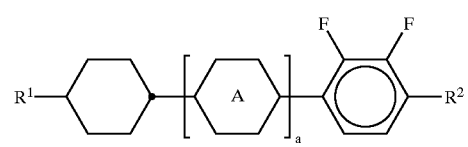

II wherein $R^1$ and $R^2$ have independently of each other one of the meanings of formula I,

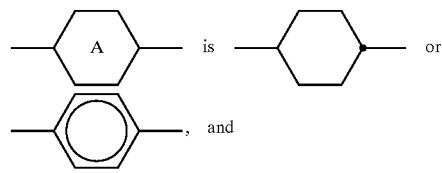

a is 0 or 1.

b) A medium which optionally additionally contains one or more compounds of the formula III:

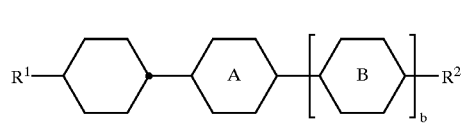

III wherein $R^1$ and $R^2$ have independently of each other one of the meanings of formula I,

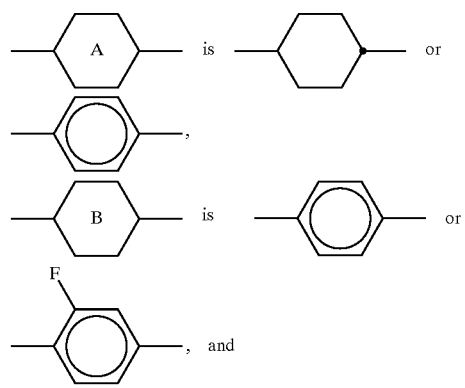

b is 0 or 1.

c) A medium which optionally additionally contains one or more compounds of the formula IV:

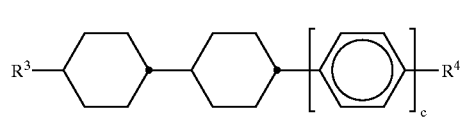

IV wherein $R^3$ is an alkenyl group with 2 to 7 C atoms, $R^4$ has one of the meanings of $R^1$ in formula I, and c is 0 or 1.

d) A medium which essentially comprises 4 or more compounds selected from the formulae I and II, at least 1 compound of the formula III and/or at least 1 compound of the formula IV.

e) A medium containing at least 3 compounds of the formula II.

f) A medium in which the proportion of compounds of the formula I in the mixture as a whole is from 2 to 30%, preferably from 3 to 20% by weight.

g) A medium in which the proportion of compounds of the formula II in the mixture as a whole is at least 40% by weight.

h) A medium which contains at least three compounds selected from the formulae IIa to IIe

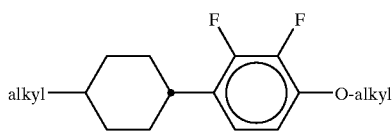

IIa

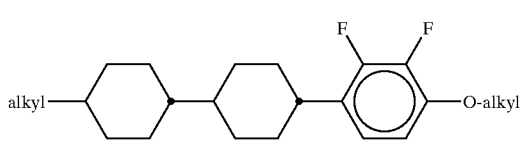

IIb

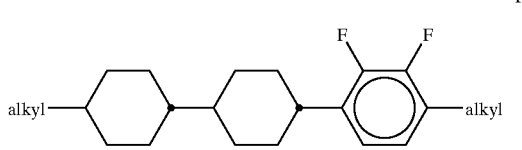

IIc

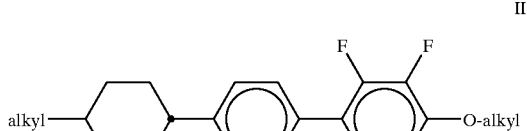

IId

IIe

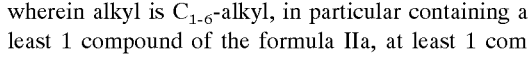

wherein alkyl is $C_{1-6}$-alkyl, in particular containing at least 1 compound of the formula IIa, at least 1 compound of the formula IIb, and/or at least 1 compound of the formula IIc.

i) A medium which contains at least one compound selected from the formulae IIIa to IIId IIIa

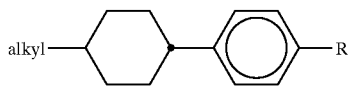

IIIb

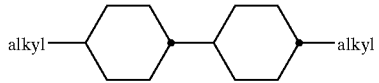

IIIc

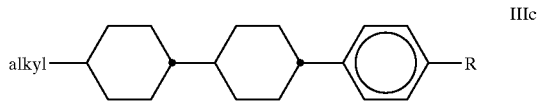

IIId

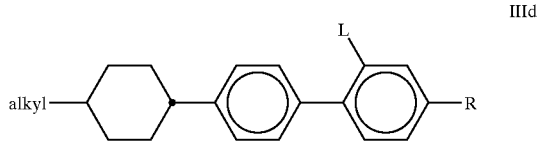

wherein alkyl is $C_{1-6}$-alkyl, R is $C_{1-6}$-alkyl or -alkoxy and L is H or F.

k) A medium which contains at least one compound selected from the formulae IVa to IVg IVa

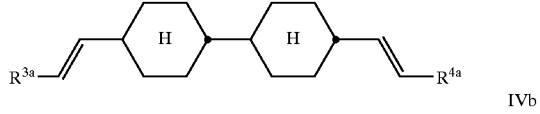

IVb

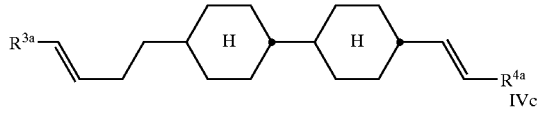

IVc

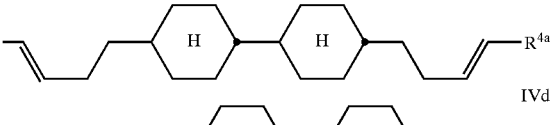

IVd

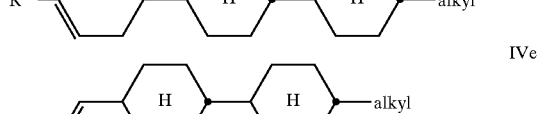

IVe

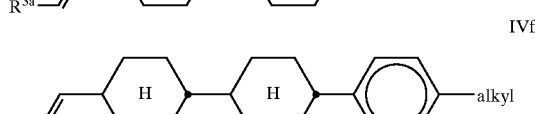

IVf

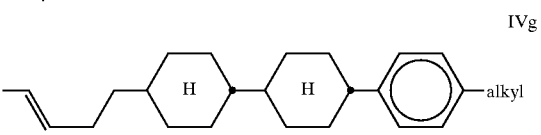

IVg wherein $R^{3a}$ and $R^{4a}$ are independently of each other H, $CH_3$, $C_2H_5$ or $n-C_3H_7$ and alkyl is $C_{1-6}$-alkyl.

l) A medium which consists essentially of:
  2–30% by weight of one or more compounds of the formula I,
  40–85% by weight of one or more compounds of the formula II,
  2–25% by weight of one or more compounds of the formula III, and
  2–25% by weight of one or more compounds of the formula IV.

m) A medium which optionally additionally contains one or more compounds selected from the formulae Va to Vd

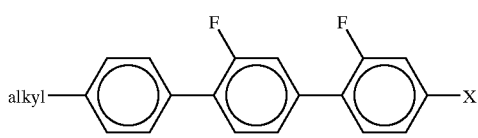
Va

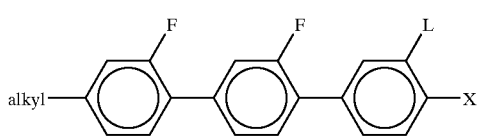
Vb

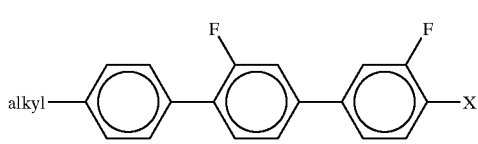
Vc

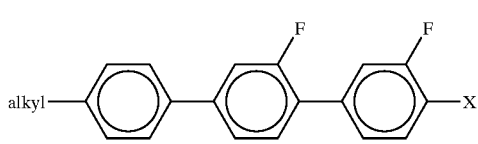
Vd wherein alkyl is $C_{1-6}$-alkyl, L is H or F and X is F or Cl, in particular containing at least one compound of formula Va and/or at least one compound of formula Vb wherein X is preferably Cl and L is preferably H.

n) A medium which optionally additionally contains one or more compounds selected from the formulae VIa and VId

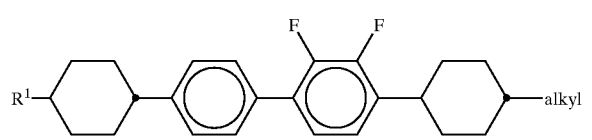
VIa

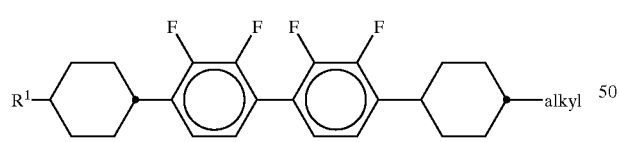
VIb wherein $R^1$ has one of the meanings of formula I and alkyl is $C_{1-6}$-alkyl.

o) A medium which optionally contains additionally one or more two-ring compounds selected from the formulae VIIa to VIIe

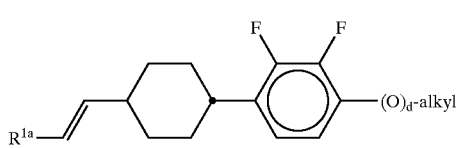
VIIa

-continued

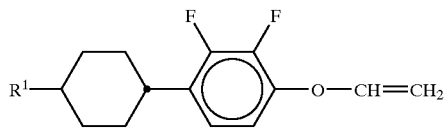
VIIb

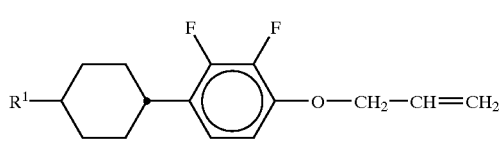
VIIc

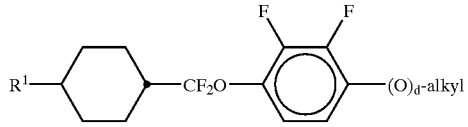
VIId

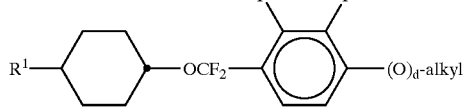
VIIe wherein $R^1$ has one of the meanings of formula I, $R^{1a}$ is H, $CH_3$, $C_2H_5$ or n-$C_3H_7$, d is 0 or 1, and alkyl is $C_{1-6}$-alkyl. In these compounds, $R^1$ is preferably $C_{1-6}$-alkyl or -alkoxy and d is preferably 1. Especially preferred are compounds of formula VIIa, VIId and VIIe.

p) A medium which optionally additionally contains one or more three-ring compounds selected from the formulae VIIIa to VIIIo

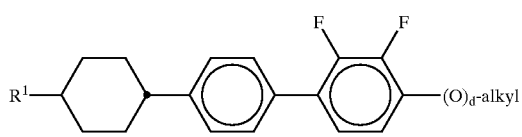
VIIIa

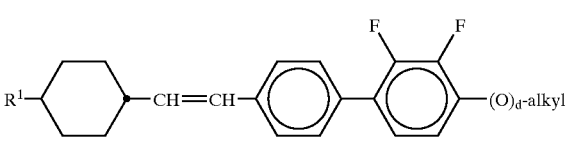
VIIIb

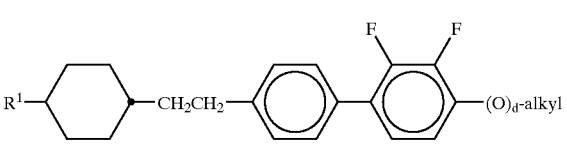
VIIIc

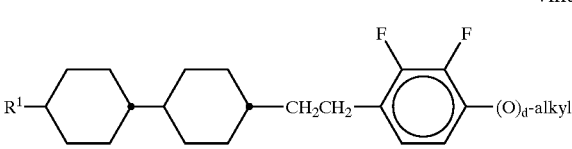
VIIId

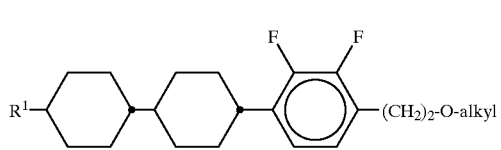
VIIIe

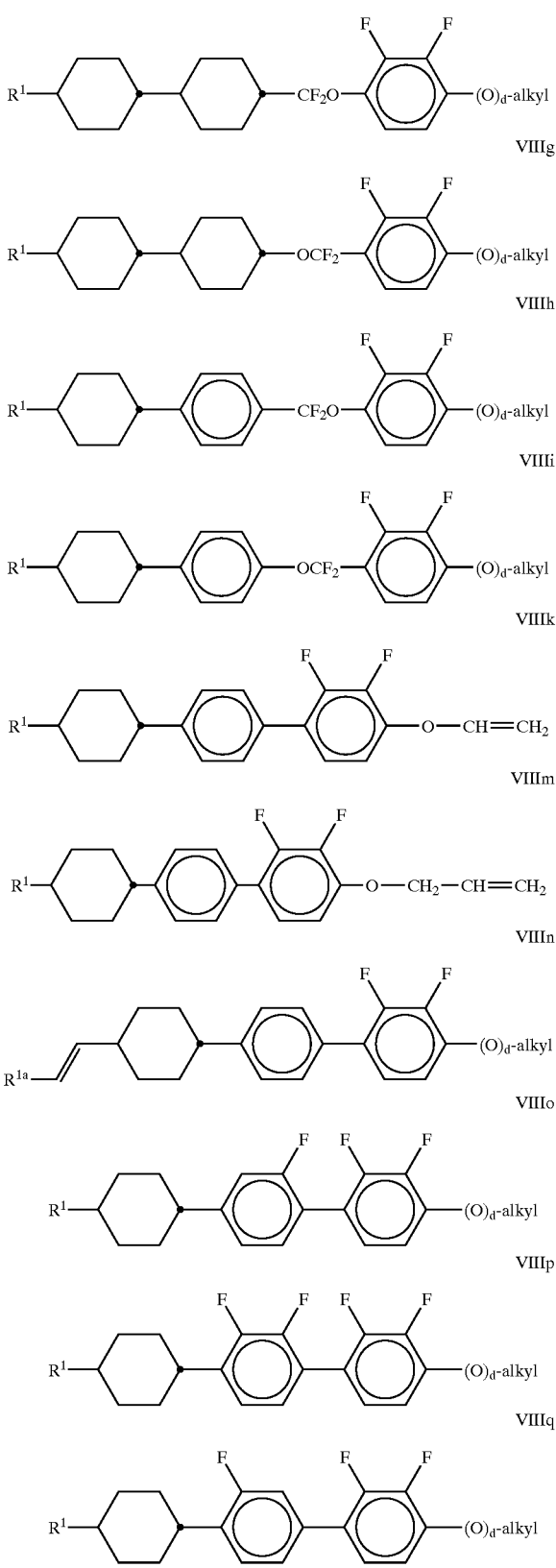

wherein $R^1$ has one of the meanings of formula I, $R^{1a}$ is H, $CH_3$, $C_2H_5$ or n-$C_3H_7$, d is 0 or 1, and alkyl is $C_{1-6}$-alkyl. In these compounds, $R^1$ is preferably $C_{1-6}$-alkyl or -alkoxy and d is preferably 1. Especially preferred are compounds of formula VIIIa, VIIId, VIIIf and VIIIg.

The invention furthermore relates to an electro-optical display having active matrix addressing based on the ECB or VA effect, characterized in that it contains, as dielectric, a liquid-crystalline medium as described above.

The invention furthermore relates to an electro-optical display with active-matrix addressing, in which the liquid crystal layer has a homeotropic or tilted homeotropic orientation in the switched-off state and which contains a liquid-crystalline medium as described above.

The liquid-crystal mixture preferably has a nematic phase range of at least 80 K, a clearing point above 60° C., in particular above 70° C., and a maximum flow viscosity of 30 $mm^2s^{-1}$ at 20° C.

The liquid-crystal mixture according to the invention has a $\Delta\in$ of from about −1.5 to −8, in particular from about −3.0 to −5.0, where $\Delta\in$ denotes the dielectric anisotropy. The rotational viscosity $\gamma_1$ is preferably <225 mPa·s, in particular <180 mPa·s.

The birefringence $\Delta n$ in the liquid-crystal mixture is generally between 0.04 and 0.15, preferably between 0.06 and 0.12. The dielectric constant $\in_\parallel$ is $\geq 3$, preferably from 3.2 to 8.5.

The liquid-crystal mixture may also contain further additives known to the person skilled in the art and described in the literature. For example, 0–15% of pleochroic dyes can be added, furthermore conductive salts, preferably ethyldimethyidodecylammonium 4-hexoxybenzoate, tetrabutylammonium tetraphenylborate or complex salts of crown ethers (cf. for example, Haller et al., Mol. Cryst. Liq. Cryst. Volume 24, pages 249–258 (1973)) in order to improve the conductivity or substances can be added in order to modify the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728. The liquid-rystal mixture may also contain UV stabilizers and antioxidants.

The individual components of the formulae I to VII of the liquid-crystal phases according to the invention are either known or their methods of preparation can easily be derived from the prior art by a person skilled in the relevant art, since they are based on standard methods described in the literature.

The term "alkenyl" in formula I to IV comprises straight chain and branched alkenyl groups with 2 to 7 C atoms. Straight chain alkenyl groups are preferred. Further preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z,hexenyl, 4E-hexenyl, 4Z-heptenyl, 5-hexenyl and 6-heptenyl. Alkenyl groups with 2 to 5 C atoms are particularly preferred.

The mixtures preferably contain 4 to 20, in particular 5 to 15, compounds of the formulae I, II, III and IV.

In addition to compounds of the formulae I to IV, other constituents may also be present, for example in an amount of up to 45% of the mixture as a whole, but preferably up to 35%, in particular up to 10%.

The other constituents are preferably selected from nematic or nemato-genic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclo-hexylcyclohexanes, cyclohexylnaphthalenes, 1,4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as components of liquid-crystalline phases of this type can be characterized by the formula IV $$R^5\text{—L—G—E—}R^6 \qquad\qquad IV$$

in which L and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G is | —CH=CH— | —N(O)=N— |
|---|---|---|
| | —CH—CQ— | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO—Phe—COO— | or a C—C single bond, Q is halogen, preferably chlorine, or —CN, and $R^5$ and $R^6$ are each alkyl, alkoxy, alkanoyloxy or alkoxycarbonyloxy having up to 18, preferably up to 8 carbon atoms, or one of these radicals is alternatively CN, NC, $NO_2$, $CF_3$, F, Cl or Br.

In most of these compounds $R^5$ and $R^6$ are different from one another, one of these radicals usually being an alkyl or alkoxy group. Other variants of the proposed substituents are also common. Many such substances or mixtures thereof are commercially available. All these substances can be prepared by methods which are known from the literature.

The structure of the liquid-crystal displays according to the invention corresponds to the conventional geometry, as described, for example, in EP-A 0 240 379.

The entire disclosure[s] of all applications, patents and publications, cited above or below, and of corresponding European Patent application No. 01109740.9, filed Apr. 20, 2001 is hereby incorporated by reference.

The following abbreviations are used:

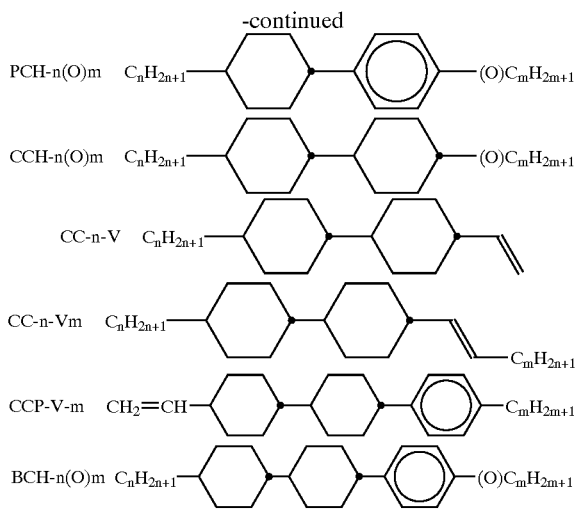

In addition:

Δn denotes the optical anisotropy measured at 20° C. and 589 nm, $n_e$ denotes the extraordinary refractive index at 20° C. and 589 nm, Δ∈ denotes the dielectric anisotropy at 20° C., $\in_{\parallel}$ denotes the dielectric constant in the parallel direction to the molecular axis, cp denotes the clearing point [° C.], T(S,N) denotes the temperature of the transition of the smectic to the nematic phase [° C.], $v_T$ denote the viscosity at the temperature T given in ° C. $[mm^2 s^{-1}]$, $\gamma_1$ denotes the rotational viscosity measured at 20° C. [mPa·s], $k_1$ denote the respective elastic constant measured at 20° C. [pN], $k_i/k_j$ denote the ratio of the respective elastic constants measured at 20° C. and $V_0$ denotes the capacitive threshold, also called fredercksz threshold measured at 20° C.

The display used for measurement of the threshold voltage has two plane-parallel outer plates at a separation of 5 μm and, on the inside of the outer plates, electrode layers with lecithin alignment layers on top which cause a homeotropic alignment of the liquid crystals.

EXAMPLE 1

A liquid-crystalline mixture comprising

| | | | |
|---|---|---|---|
| PCH-502FF | 12.0% | cp | 79° C. |
| PCH-302FF | 12.0% | Δn | 0.0781 |
| PCH-504FF | 11.0% | $n_\theta$ | 1.5524 |
| CCP-302FF | 13.5% | Δ∈ | −3.8 |
| CCP-502FF | 11.5% | $\in_{\parallel}$ | 3.6 |
| CCP-21FF | 2.5% | | |
| CCP-31FF | 2.5% | | |
| CCH-35 | 8.0% | | |
| CC-5-V | 7.0% | | |
| CC-3-V1 | 6.0% | | |
| CCP-V-1 | 3.0% | | |
| CCH-501 | 6.0% | | |
| CCOC-3-3 | 5.0% | | |

EXAMPLE 2

A liquid-crystalline mixture comprising

| | | | | |
|---|---|---|---|---|
| PCH-302FF | 16.0% | cp | 71° C. | |
| PCH-304FF | 18.0% | $\Delta n$ | 0.0788 | |
| PCH-502FF | 8.0% | $n_e$ | 1.5516 | |
| CCP-302FF | 14.0% | $\Delta\epsilon$ | −4.4 | |
| CCP-502FF | 13.0% | $\epsilon_{\parallel}$ | 3.8 | |
| CC-3-V1 | 9.0% | | | |
| CC-5-V | 6.5% | | | |
| CCH-35 | 10.0% | | | |
| CCOC-3-3 | 4.0% | | | |
| CCH-501 | 1.5% | | | |

EXAMPLE 3

A liquid-crystalline mixture comprising

| | | | | |
|---|---|---|---|---|
| PCH-302FF | 18.0% | cp | 75° C. | |
| PCH-502FF | 10.0% | $\Delta n$ | 0.0789 | |
| PCH-504FF | 17.0% | $n_e$ | 1.5521 | |
| CCP-302FF | 15.0% | $\Delta\epsilon$ | −4.6 | |
| CCP-502FF | 14.0% | $\epsilon_{\parallel}$ | 3.7 | |
| CCH-35 | 11.0% | | | |
| CC-5-V | 4.0% | | | |
| CC-3-V1 | 5.0% | | | |
| CCOC-3-3 | 3.0% | | | |
| CCOC-4-3 | 3.0% | | | |

EXAMPLE 4

A liquid-crystalline mixture comprising

| | | | | |
|---|---|---|---|---|
| PCH-304FF | 18.0% | cp | 74° C. | |
| PCH-502FF | 12.0% | $\Delta n$ | 0.0816 | |
| PCH-504FF | 18.0% | $n_e$ | 1.5549 | |
| CCP-302FF | 16.0% | $\Delta\epsilon$ | −4.7 | |
| CCP-502FF | 10.0% | $\epsilon_{\parallel}$ | 3.8 | |
| CCH-35 | 7.0% | | | |
| CC-3-V1 | 8.0% | | | |
| CCP-V-1 | 3.0% | | | |
| CCOC-3-3 | 4.0% | | | |
| CCOC-4-3 | 4.0% | | | |

EXAMPLE 5

A liquid-crystalline mixture comprising

| | | | | |
|---|---|---|---|---|
| PCH-302FF | 18.0% | cp | 75° C. | |
| PCH-304FF | 2.0% | $\Delta n$ | 0.0798 | |
| PCH-502FF | 18.0% | $n_e$ | 1.5534 | |
| CCP-302FF | 16.0% | $\Delta\epsilon$ | −4.5 | |
| CCP-502FF | 15.0% | $\epsilon_{\parallel}$ | 3.8 | |
| CCH-35 | 3.5% | | | |
| CCH-303 | 5.0% | | | |
| CCH-501 | 8.0% | | | |
| CCOC-3-3 | 3.0% | | | |
| CC-5-V | 3.0% | | | |
| CC-3-V1 | 8.5% | | | |

EXAMPLE 6

A liquid-crystalline mixture comprising

| | | | | |
|---|---|---|---|---|
| PCH-304FF | 8.0% | cp | 75° C. | |
| PCH-502FF | 20.0% | $\Delta n$ | 0.0779 | |
| PCH-504FF | 15.0% | $n_e$ | 1.5511 | |
| CCP-302FF | 20.0% | $\Delta\epsilon$ | −4.5 | |
| CCP-502FF | 8.0% | $\epsilon_{\parallel}$ | 3.7 | |
| CCH-35 | 13.0% | | | |
| CCH-501 | 6.0% | | | |
| CC-3-V1 | 5.0% | | | |
| CCOC-3-3 | 3.0% | | | |
| CCOC-4-3 | 2.0% | | | |

EXAMPLE 7

A liquid-crystalline mixture comprising

| | | | | |
|---|---|---|---|---|
| PCH-304FF | 17.0% | cp | 70° C. | |
| PCH-502FF | 17.0% | $\Delta n$ | 0.0825 | |
| PCH-504FF | 16.0% | $n_e$ | 1.5557 | |
| CCP-302FF | 12.0% | $\Delta\epsilon$ | −4.9 | |
| CCP-502FF | 10.0% | $\epsilon_{\parallel}$ | 4.0 | |
| CPY-2-O2 | 5.0% | | | |
| CC-3-V1 | 3.0% | | | |
| CCH-35 | 12.0% | | | |
| CCOC-3-3 | 4.0% | | | |
| CCOC-4-3 | 4.0% | | | |

EXAMPLE 8

A liquid-crystalline mixture comprising

| | | | | |
|---|---|---|---|---|
| PCH-302FF | 20.0% | cp | 74° C. | |
| PCH-304FF | 1.5% | $\Delta n$ | 0.0793 | |
| PCH-502FF | 19.0% | $n_e$ | 1.5517 | |
| CCP-302FF | 14.0% | $\Delta\epsilon$ | −4.4 | |
| CCP-502FF | 14.0% | $\epsilon_{\parallel}$ | 3.8 | |
| CCH-35 | 7.0% | | | |
| CCH-303 | 6.0% | | | |
| CCH-501 | 3.0% | | | |
| CCOC-3-3 | 3.5% | | | |
| CCOC-4-3 | 1.5% | | | |
| CC-5-V | 4.0% | | | |
| CC-3-V1 | 6.5% | | | |

EXAMPLE 9

A liquid-crystalline mixture comprising

| | | | | |
|---|---|---|---|---|
| PCH-302FF | 16.0% | cp | 75° C. | |
| PCH-304FF | 10.0% | $\Delta n$ | 0.0779 | |
| PCH-502FF | 15.0% | $n_e$ | 1.5519 | |
| CCP-302FF | 12.0% | $\Delta\epsilon$ | −4.3 | |
| CCP-502FF | 11.0% | $\epsilon_{\parallel}$ | 3.8 | |
| CCP-21FF | 6.0% | $\gamma_1$ | 155 mPa·s | |
| CCH-35 | 11.0% | $k_1$ | 13.2 pN | |
| CC-5-V | 9.0% | $k_3/k_1$ | 1.15 | |
| CCOC-3-3 | 5.0% | $V_0$ | 1.99 V | |
| CCOC-4-3 | 5.0% | | | |

EXAMPLE 10

A liquid-crystalline mixture comprising

| | | | | |
|---|---|---|---|---|
| PCH-304FF | 14.75% | cp | 75° | C. |
| PCH-502FF | 20.0% | $\Delta n$ | 0.0833 | |
| CCP-302FF | 12.5% | $n_e$ | 1.5584 | |
| CCP-502FF | 5.5% | $\Delta\epsilon$ | −3.7 | |
| CPY-2-O2 | 8.75% | $\epsilon_\parallel$ | 3.5 | |
| CPY-3-O2 | 1.75% | $\gamma_1$ | 127 | mPa · s |
| CCH-35 | 13.0% | $k_1$ | 14.0 | pN |
| CC-5-V | 13.0% | $k_3/k_1$ | 1.09 | |
| CC-3-V1 | 7.25% | $V_0$ | 2.13 | V |
| CCOC-3-3 | 3.5% | | | |

EXAMPLE 11

A liquid-crystalline mixture comprising

| | | | | |
|---|---|---|---|---|
| PCH-302FF | 16.0% | cp | 76° | C. |
| PCH-304FF | 15.0% | $\Delta n$ | 0.0830 | |
| PCH-502FF | 15.0% | $n_e$ | 1.5586 | |
| CCP-302FF | 11.0% | $\Delta\epsilon$ | −4.9 | |
| CCP-502FF | 11.0% | $\epsilon_\parallel$ | 3.9 | |
| CCH-35 | 10.0% | $\gamma_1$ | 180 | mPa · s |
| CCP-21FF | 7.0% | $k_1$ | 12.8 | pN |
| CCV-V-1 | 5.0% | $k_3/k_1$ | 1.22 | |
| CCOC-3-3 | 5.0% | $V_0$ | 1.90 | V |
| CCOC-4-3 | 5.0% | | | |

EXAMPLE 12

A liquid-crystalline mixture comprising

| | | | | |
|---|---|---|---|---|
| PCH-302FF | 20.0% | cp | 75° | C. |
| PCH-304FF | 6.0% | $\Delta n$ | 0.0826 | |
| PCH-502FF | 10.0% | $n_e$ | 1.5576 | |
| CCP-302FF | 13.0% | $\Delta\epsilon$ | −3.9 | |
| CCP-502FF | 8.5% | $\epsilon_\parallel$ | 3.6 | |
| CPY-2-O2 | 3.0% | $\gamma_1$ | 125 | mPa · s |
| CPY-3-O2 | 2.5% | $k_1$ | 13.8 | pN |
| CC-5-V | 17.5% | $k_3/k_1$ | 1.17 | |
| CC-3-V1 | 13.0% | $V_0$ | 2.15 | V |
| CCOC-3-3 | 4.5% | | | |
| CCOC-4-3 | 2.0% | | | |

EXAMPLE 13

A liquid-crystalline mixture comprising

| | | | | |
|---|---|---|---|---|
| PCH-302FF | 20.0% | cp | 75° | C. |
| PCH-502FF | 12.0% | $\Delta n$ | 0.0821 | |
| CCP-302FF | 13.0% | $n_e$ | 1.5574 | |
| CCP-502FF | 10.0% | $\Delta\epsilon$ | −3.8 | |
| CPY-2-O2 | 9.0% | $\epsilon_\parallel$ | 3.7 | |
| CC-3-V | 19.5% | $\gamma_1$ | 116 | mPa · s |
| CCH-34 | 11.5% | $k_1$ | 13.2 | pN |
| CCOC-3-3 | 5.0% | $k_3/k_1$ | 1.14 | |
| | | $V_0$ | 2.06 | V |

EXAMPLE 14

A liquid-crystalline mixture comprising

| | | | | |
|---|---|---|---|---|
| PCH-302FF | 16.0% | cp | 72.5° | C. |
| PCH-304FF | 11.0% | $\Delta n$ | 0.0808 | |
| PCH-502FF | 7.0% | $n_e$ | 1.5564 | |
| CCP-303FF | 12.0% | $\Delta\epsilon$ | −3.6 | |
| CCP-402FF | 7.0% | $\epsilon_\parallel$ | 3.6 | |
| CPY-2-O2 | 9.0% | $\gamma_1$ | 113 | mPa · s |
| CCH-34 | 7.0% | $k_1$ | 13.6 | pN |
| CCH-35 | 7.0% | $k_3/k_1$ | 1.01 | |
| CC-5-V | 10.0% | $V_0$ | 2.06 | V |
| CC-3-V1 | 11.0% | | | |
| CCOC-3-3 | 3.0% | | | |

EXAMPLE 15

A liquid-crystalline mixture comprising

| | | | | |
|---|---|---|---|---|
| PCH-502FF | 12.0% | cp | 86° | C. |
| PCH-504FF | 14.0% | $\Delta n$ | 0.1000 | |
| CCP-104FF | 12.0% | $n_e$ | 1.5795 | |
| CPY-2-O2 | 13.0% | $\Delta\epsilon$ | −3.8 | |
| CPY-3-O2 | 13.0% | $\epsilon_\parallel$ | 3.5 | |
| CCOC-3-3 | 3.0% | $\gamma_1$ | 171 | mPa · s |
| CCOC-4-3 | 3.0% | $k_1$ | 16.4 | pN |
| CC-3-V1 | 14.0% | $k_3/k_1$ | 0.99 | |
| CC-5-V | 8.0% | $V_0$ | 2.18 | V |
| CCH-35 | 6.0% | | | |
| BCH-32 | 2.0% | | | |

EXAMPLE 16

A liquid-crystalline mixture comprising

| | | | | |
|---|---|---|---|---|
| PCH-304FF | 4.0% | cp | 86.5° | C. |
| PCH-502FF | 12.0% | T(S,N) | <−30° | C. |
| PCH-504FF | 9.0% | $\Delta n$ | 0.1000 | |
| CCP-102FF | 12.0% | $n_e$ | 1.5796 | |
| CPY-2-O2 | 13.0% | $\Delta\epsilon$ | −3.8 | |
| CPY-3-O2 | 13.0% | $\epsilon_\parallel$ | 3.5 | |
| CCOC-3-3 | 3.0% | $\gamma_1$ | 164 | mPa · s |
| CCOC-4-3 | 3.0% | $k_1$ | 16.2 | pN |
| CC-3-V1 | 11.0% | $k_3/k_1$ | 1.03 | |
| CC-5-V | 12.0% | $V_0$ | 2.02 | V |
| CCH-35 | 6.0% | | | |
| BCH-32 | 2.0% | | | |

EXAMPLE 17

A liquid-crystalline mixture comprising

| | | | | |
|---|---|---|---|---|
| PCH-304FF | 13.0% | cp | 86° | C. |
| PCH-502FF | 12.0% | T(S,N) | <−30° | C. |
| PCH-504FF | 2.0% | $\Delta n$ | 0.0994 | |
| CCP-302FF | 12.0% | $n_e$ | 1.5786 | |
| CPY-2-O2 | 13.0% | $\Delta\epsilon$ | −3.9 | |
| CPY-3-O2 | 13.0% | $\epsilon_\parallel$ | 3.5 | |
| CCOC-3-3 | 3.0% | $\gamma_1$ | 156 | mPa · s |
| CCOC-4-3 | 2.0% | $k_1$ | 15.4 | pN |
| CC-3-V1 | 15.0% | $k_3/k_1$ | 1.09 | |
| CC-5-V | 15.0% | $V_0$ | 2.20 | V |

EXAMPLE 18

A liquid-crystalline mixture comprising

| | | | |
|---|---|---|---|
| PCH-304FF | 17.0% | cp | 75.5° C. |
| PCH-502FF | 10.0% | Δn | 0.0790 |
| PCH-504FF | 12.0% | $n_e$ | 1.5523 |
| CCP-302FF | 13.0% | Δε | −4.5 |
| CCP-502FF | 13.0% | $\varepsilon_\parallel$ | 3.8 |
| CCP-21FF | 5.0% | $\gamma_1$ | 170 mPa · s |
| CCH-35 | 10.0% | $k_1$ | 13.2 pN |
| CC-5-V | 6.0% | $k_3/k_1$ | 1.12 |
| CC-3-V1 | 2.0% | $V_0$ | 1.91 V |
| CCOC-3-3 | 4.0% | | |
| CCOC-4-3 | 3.0% | | |

EXAMPLE 19

A liquid-crystalline mixture comprising

| | | | |
|---|---|---|---|
| PCH-304FF | 12.0% | cp | 74.5° C. |
| PCH-502FF | 12.0% | Δn | 0.0814 |
| PCH-504FF | 18.0% | k1$n_e$ | 1.5558 |
| CCP-303FF | 10.0% | Δε | −4.2 |
| CCP-402FF | 10.0% | $\varepsilon_\parallel$ | 3.7 |
| CPY-2-O2 | 7.0% | $\gamma_1$ | 161 mPa · s |
| CCH-35 | 7.0% | $k_1$ | 13.1 pN |
| CC-3-V1 | 11.0% | $k_3/k_1$ | 1.01 |
| CC-5-V | 3.0% | $V_0$ | 1.92 V |
| CCOC-3-3 | 3.0% | | |
| CCOC-3-5 | 3.0% | | |
| CCOC-4-3 | 4.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds including at least one compound of formula I

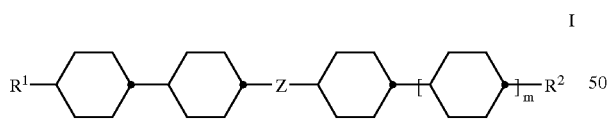

wherein $R^1$ and $R^2$ are independently of each other an alkyl, alkoxy or alkenyl group with 1 to 12 C atoms, one or more $CH_2$ groups in these radicals optionally replaced, in each case independently of one another, by —O—, —CH=CH—, —CO—, —OCO— or —COO— in such a manner that oxygen atoms are not linked directly to one another, Z is $OCH_2$ or $CH_2O$, and m is 0 or 1, wherein the medium exhibits a dielectric anisotropy, Δε, of −1.5 or less.

2. A medium according to claim 1, which additionally comprises one or more compounds of formula II

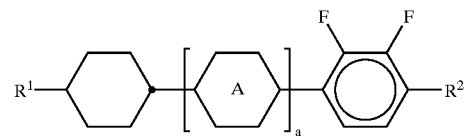

wherein $R^1$ and $R^1$ have independently of each other one of the meanings of formula I,

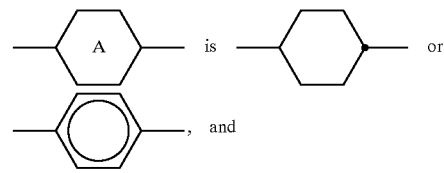

a is 0 or 1.

3. A medium according to claim 1, which additionally comprises at least one compound of formula III

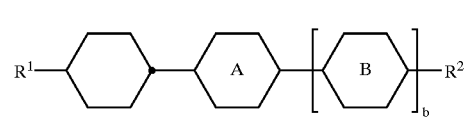

wherein $R^1$ and $R^2$ have, independently of each other, one of the meanings of formula I,

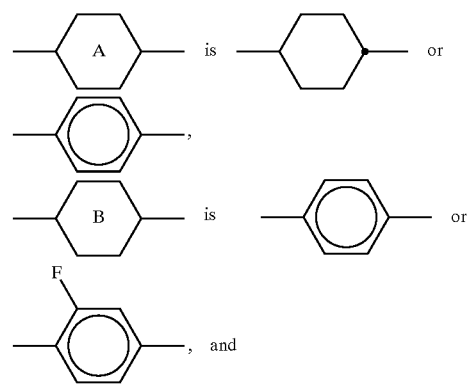

b is 0 or 1.

4. A medium according to claim 2, which additionally comprises at least one compound of formula III

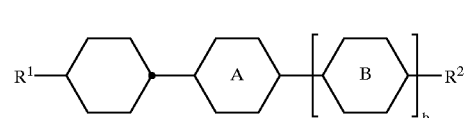

wherein $R^1$ and $R^2$ have, independently of each other, one of the meanings of formula I,

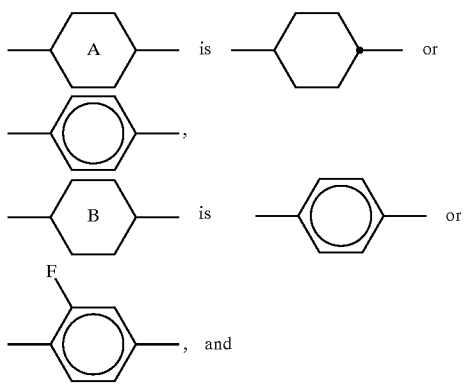

b is 0 or 1.

5. A medium according to claim 1, which additionally comprises one or more compounds of formula IV

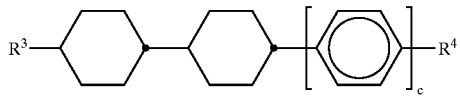

wherein $R^3$ is an alkenyl group with 2 to 7 C atoms, $R^4$ has one of the meanings of $R^1$ in formula I, and c is 0 or 1.

6. A medium according to claim 2, which additionally comprises one or more compounds of formula IV

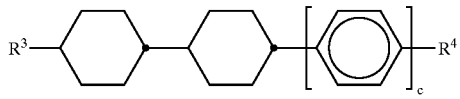

wherein $R^3$ is an alkenyl group with 2 to 7 C atoms, $R^4$ has one of the meanings of $R^1$ in formula I, and c is 0 or 1.

7. A medium according to claim 3, which additionally comprises one or more compounds of formula IV

wherein $R^3$ is an alkenyl group with 2 to 7 C atoms, $R^4$ has one of the meanings of $R^1$ in formula I, and c is 0 or 1.

8. A medium according to claim 4, which additionally comprises one or more compounds of formula IV

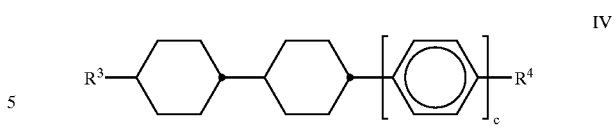

wherein $R^3$ is an alkenyl group with 2 to 7 C atoms, $R^4$ has one of the meanings of $R^1$ in formula I and c is 0 or 1.

9. A medium according to claim 8, which consists essentially of 4 or more compounds selected from the formulae I and II, at least 1 compound of the formula III, and at least 1 compound of the formula IV.

10. A medium according to claim 1, which comprises at least one compound of formula I wherein m is 0 and Z is $CH_2O$.

11. A liquid-crystalline medium according to claim 2, which comprises at least 3 compounds selected from those of the formulae IIa to IIe

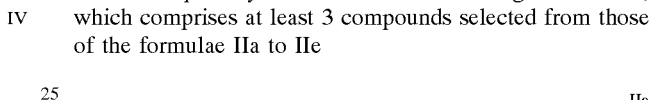

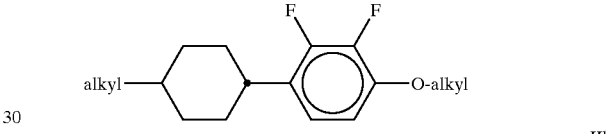

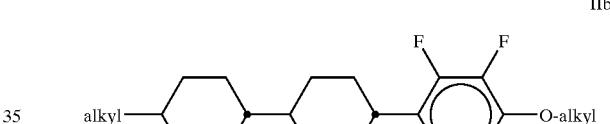

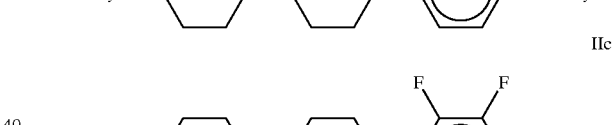

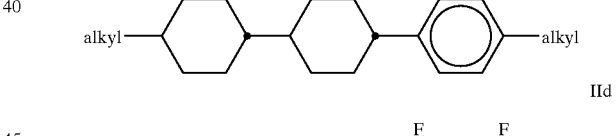

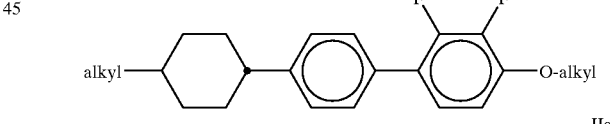

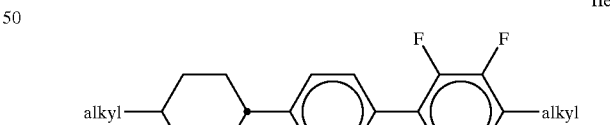

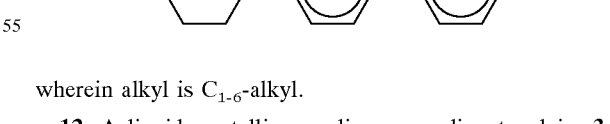

wherein alkyl is $C_{1-6}$-alkyl.

12. A liquid-crystalline medium according to claim 3, which comprises at least one compound selected from those of the formulae IIIa to IIId

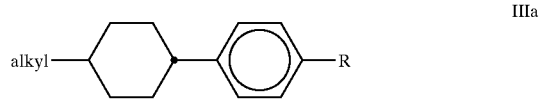

-continued

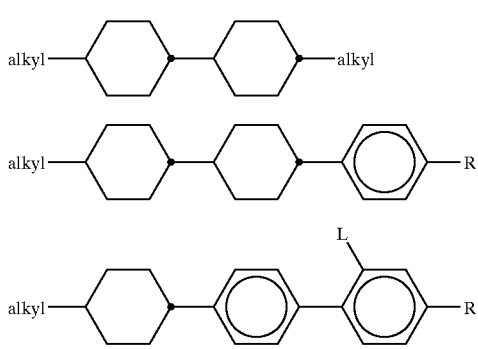

wherein alkyl is $C_{1-6}$-alkyl, R is $C_{1-6}$-alkyl or -alkoxy and L is H or F.

13. A liquid-crystalline medium according to claim 5, which comprises at least one compound selected from those of the formulae IVa to IVg

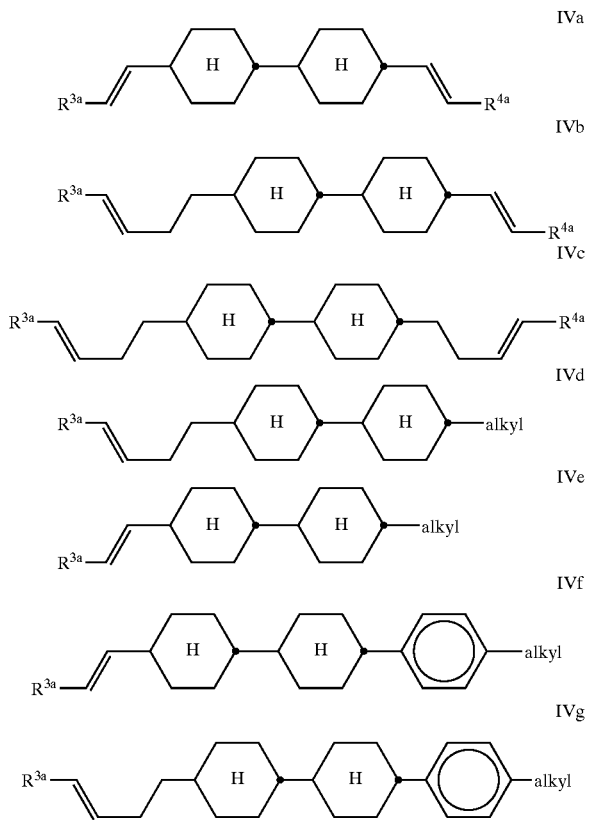

wherein $R^{3a}$ and $R^{4a}$ are independently of each other H, $CH_3$, $C_2H_5$ or n-$C_3H_7$ and alkyl is $C_{1-6}$-alkyl.

14. A liquid-crystalline medium according to claim 8, which consists essentially of:
  2–30% by weight of one or more compounds of the formula I,
  40–85% by weight of one or more compounds of the formula II,
  2–25% by weight of one or more compounds of the formula III, and
  2–25% by weight of one or more compounds of the formula IV.

15. An electro-optical display having active matrix addressing based on the VA or ECB effect, which comprises as dielectric, a liquid-crystalline medium according to one of claim 1.

16. An electro-optical display having active matrix addressing based on the VA or ECB effect, which comprises as dielectric, a liquid-crystalline medium according to one of claim 2.

17. An electro-optical display having active matrix addressing based on the VA or ECB effect, which comprises as dielectric, a liquid-crystalline medium according to one of claim 3.

18. An electro-optical display having active matrix addressing based on the VA or ECB effect, which comprises as dielectric, a liquid-crystalline medium according to one of claim 5.

19. The electro-optical display of claim 15, wherein the dielectric has a homeotropic or tilted homeotropic orientation in the switched-off state.

20. A medium according to claim 1, which exhibits:
  a nematic phase range of at least 80 K,
  a clearing point above 60° C.,
  a maximum flow viscosity of 30 $mm^2s^{-1}$ at 20° C.,
  a $\Delta\in$ of from about –1.5 to –8.0,
  a rotational viscosity of <225 mPa·s,
  a birefringence of from 0.04 to 0.15 and
  a dielectric constant $\in_{\parallel}$ of $\geq 3$.

21. A medium according to claim 1, which exhibits a $\Delta\in$ of from –1.5 to –8.0.

22. A liquid-crystalline medium comprising a mixture of polar compounds including:
  at least one compound of formula I

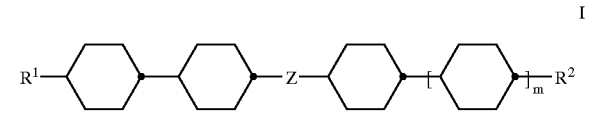

wherein
  $R^1$ and $R^2$ are independently of each other an alkyl, alkoxy or alkenyl group with 1 to 12 C atoms, one or more $CH_2$ groups in these radicals optionally replaced, in each case independently of one another, by —O—, —CH=CH—, —CO—, —OCO— or —COO— in such a manner that oxygen atoms are not linked directly to one another,
  Z is $OCH_2$ or $CH_2O$, and
  m is 0 or 1, and;
  one or more compounds of formula II

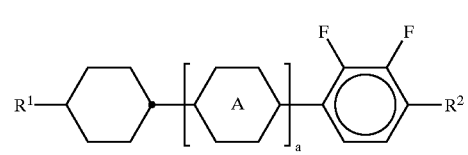

wherein
  $R^1$ and $R^2$ have independently of each other one of the meanings of formula I,

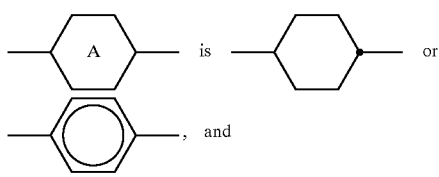

a is 0 or 1.

23. A medium according to claim 22, which additionally comprises at least one compound of formula III

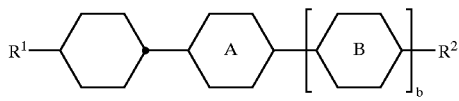

wherein

R$^1$ and R$^2$ have, independently of each other, one of the meanings of formula I,

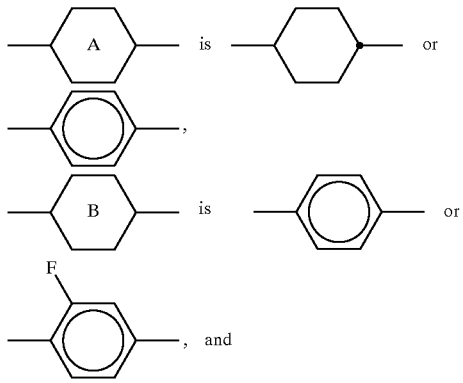

b is 0 or 1.

24. A medium according to claim 22, which additionally comprises one or more compounds of formula IV

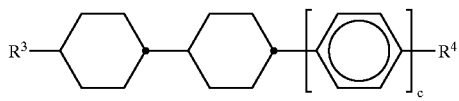

wherein

R$^3$ is an alkenyl group with 2 to 7 C atoms,
R$^4$ has one of the meanings of R$^1$ in formula I, and
c is 0 or 1.

25. A medium according to claim 23, which additionally comprises one or more compounds of formula IV

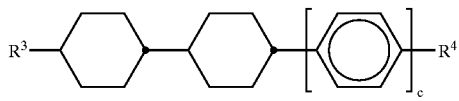

wherein

R$^3$ is an alkenyl group with 2 to 7 C atoms,
R$^4$ has one of the meanings of R$^1$ in formula I, and
c is 0 or 1.

26. A medium according to claim 25, which consists essentially of 4 or more compounds selected from the formulae I and II, at least 1 compound of the formula III, and at least 1 compound of the formula IV.

27. A medium according to claim 22, which comprises at least one compound of formula I wherein m is 0 and Z is CH$_2$O.

28. A liquid-crystalline medium according to claim 22, which comprises at least 3 compounds selected from those of the formulae IIa to IIe

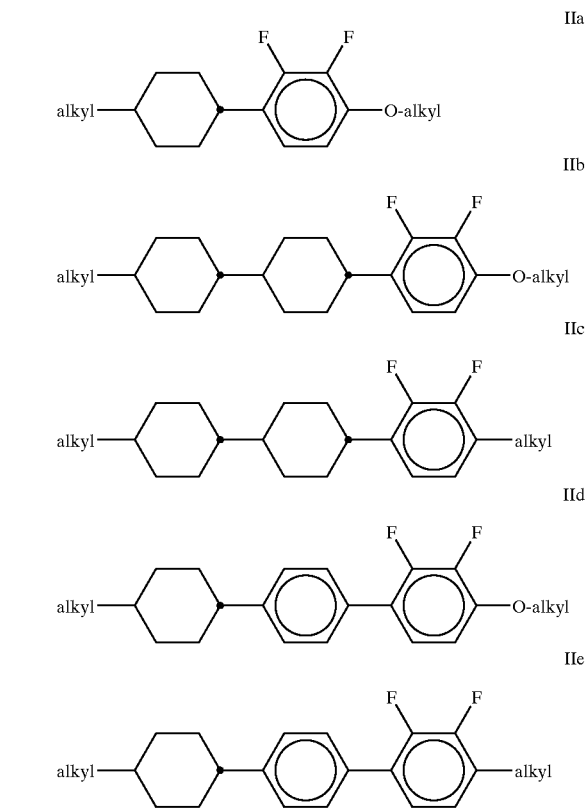

wherein alkyl is C$_{1-6}$-alkyl.

29. A liquid-crystalline medium according to claim 23, which comprises at least one compound selected from those of the formulae IIIa to IIId

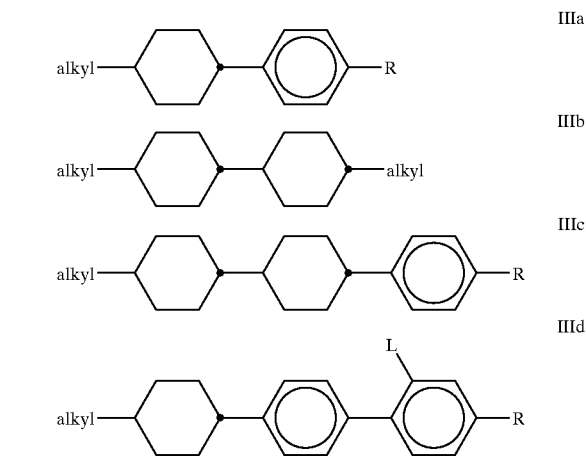

wherein alkyl is C$_{1-6}$-alkyl, R is C$_{1-6}$-alkyl or -alkoxy and L is H or F.

30. A liquid-crystalline medium according to claim 25, which comprises at least one compound selected from those of the formulae IVa to IVg

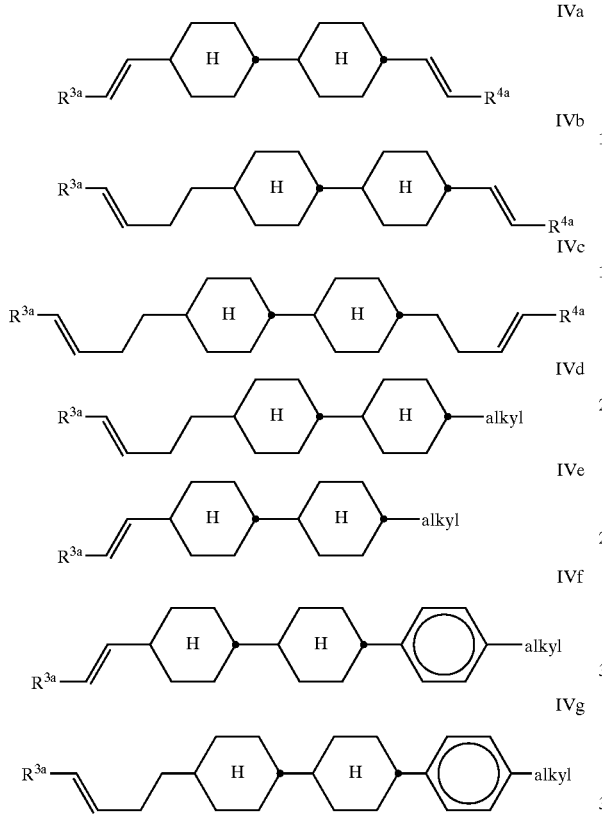

wherein $R^{3a}$ and $R^{4a}$ are independently of each other H, $CH_3$, $C_2H_5$ or $n-C_3H_7$ and alkyl is $C_{1-6}$-alkyl.

31. A liquid-crystalline medium according to claim 25, which consists essentially of:

2–30% by weight of one or more compounds of the formula I,

40–85% by weight of one or more compounds of the formula II,

2–25% by weight of one or more compounds of the formula III, and

2–25% by weight of one or more compounds of the formula IV.

32. An electro-optical display having active matrix addressing based on the VA or ECB effect, which comprises as dielectric, a liquid-crystalline medium according to claim 22.

33. An electro-optical display having active matrix addressing based on the VA or ECB effect, which comprises as dielectric, a liquid-crystalline medium according to claim 23.

34. The electro-optical display of claim 32, wherein the dielectric has a homeotropic or tilted homeotropic orientation in the switched-off state.

35. A liquid-crystalline medium comprising a mixture of polar compounds including at least one compound of formula I

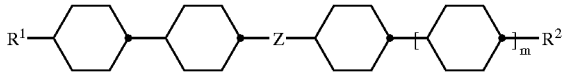

wherein $R^1$ and $R^2$ are independently of each other an alkyl, alkoxy or alkenyl group with 1 to 12 C atoms, one or more $CH_2$ groups in these radicals optionally replaced, in each case independently of one another, by —O—, —CH=CH—, —CO—, —OCO— or —COO— in such a manner that oxygen atoms are not linked directly to one another, Z is $OCH_2$ or $CH_2O$, and m is 0 or 1, wherein the medium exhibits:

a nematic phase range of at least 80 K, a clearing point above 60° C., a maximum flow viscosity of 30 $mm^2s^{-1}$ at 20° C., a $\Delta\epsilon$ of from about −1.5 to −8.0, a rotational viscosity of <225 mpPa·s, a birefringence of from 0.04 to 0.15 and a dielectric constant $\epsilon_\parallel$ of $\geq 3$.

36. A medium according to claim 35, which additionally comprises one or more compounds of formula II

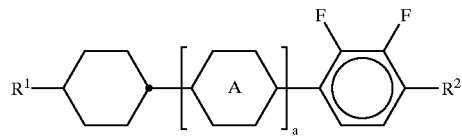

wherein $R^1$ and $R^2$ have independently of each other one of the meanings of formula I,

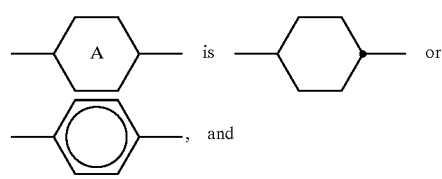

a is 0 or 1.

37. A medium according to claim 35, which additionally comprises at least one compound of formula III

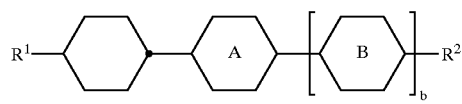

wherein $R^1$ and $R^2$ have, independently of each other, one of the meanings of formula I,

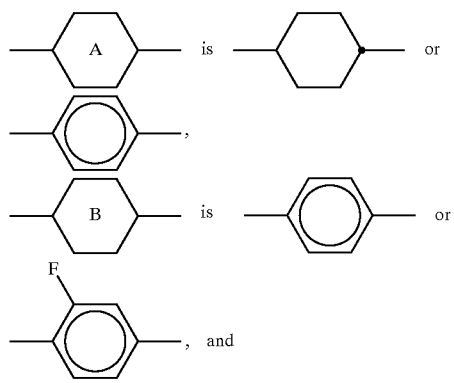

b is 0 or 1.

38. A medium according to claim 36, which additionally comprises at least one compound of formula III

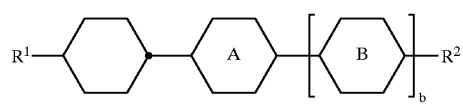

wherein $R^1$ and $R^2$ have, independently of each other, one of the meanings of formula I,

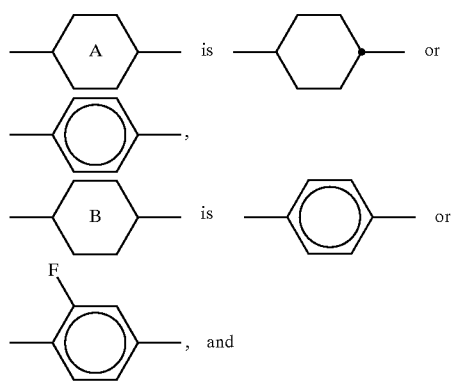

b is 0 or 1.

39. A medium according to claim 35, which additionally comprises one or more compounds of formula IV

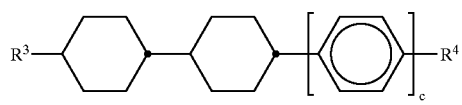

wherein $R^3$ is an alkenyl group with 2 to 7 C atoms, $R^4$ has one of the meanings of $R^1$ in formula I, and c is 0 or 1.

40. A medium according to claim 36, which additionally comprises one or more compounds of formula IV

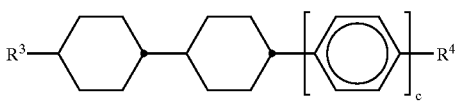

wherein $R^3$ is an alkenyl group with 2 to 7 C atoms, $R^4$ has one of the meanings of $R^1$ in formula I, and c is 0 or 1.

41. A medium according to claim 37, which additionally comprises one or more compounds of formula IV

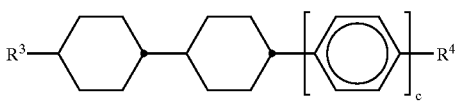

wherein $R^3$ is an alkenyl group with 2 to 7 C atoms, $R^4$ has one of the meanings of $R^1$ in formula I, and c is 0 or 1.

42. A medium according to claim 38, which additionally comprises one or more compounds of formula IV wherein $R^3$ is an alkenyl group with 2 to 7 C atoms, $R^4$ has one of the meanings of $R^1$ in formula I, and c is 0 or 1.

43. A medium according to claim 42, which consists essentially of 4 or more compounds selected from the formulae I and II, at least 1 compound of the formula III, and at least 1 compound of the formula IV.

44. A medium according to claim 35, which comprises at least one compound of formula I wherein m is 0 and Z is $CH_2O$.

45. A liquid-crystalline medium according to claim 36, which comprises at least 3 compounds selected from those of the formulae IIa to IIe

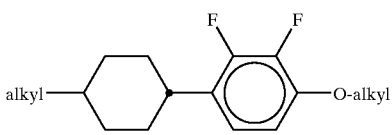

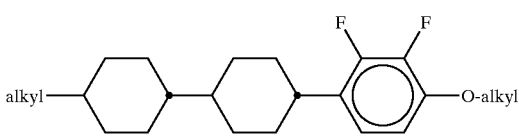

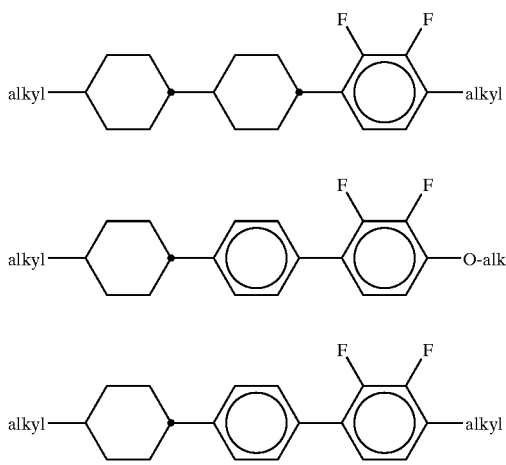

wherein alkyl is $C_{1-6}$-alkyl.

46. A liquid-crystalline medium according to claim 37, which comprises at least one compound selected from those of the formulae IIIa to IIId

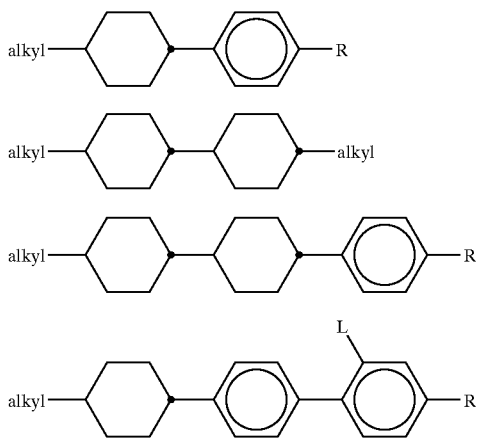

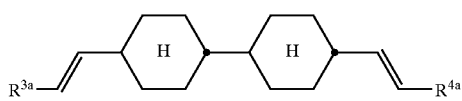

wherein alkyl is $C_{1-6}$-alkyl, R is $C_{1-6}$-alkyl or -alkoxy and L is H or F.

47. A liquid-crystalline medium according to claim 39, which comprises at least one compound selected from those of the formulae IVa to IVg

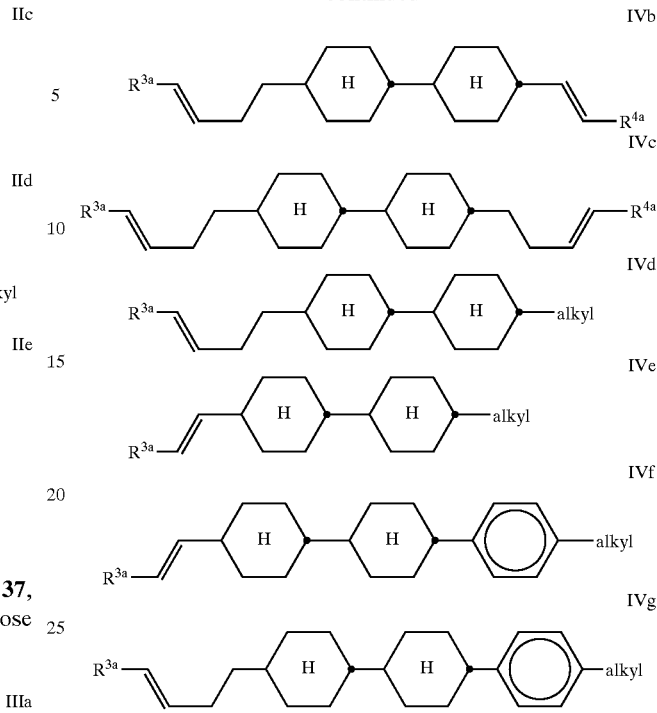

wherein $R^{3a}$ and $R^{4a}$ are independently of each other H, $CH_3$, $C_2H_5$ or n-$C_3H_7$ and alkyl is $C_{1-6}$-alkyl.

48. A liquid-crystalline medium according to claim 42, which consists essentially of:

2–30% by weight of one or more compounds of the formula I,

40–85% by weight of one or more compounds of the formula II,

2–25% by weight of one or more compounds of the formula III, and

2–25% by weight of one or more compounds of the formula IV.

49. An electro-optical display having active matrix addressing based on the VA or ECB effect, which comprises as dielectric, a liquid-crystalline medium according to one of claim 35.

50. The electro-optical display of claim 49, wherein the dielectric has a homeotropic or tilted homeotropic orientation in the switched-off state.

* * * * *